(12) United States Patent
Dunten et al.

(10) Patent No.: US 11,897,704 B2
(45) Date of Patent: Feb. 13, 2024

(54) SYSTEM AND METHOD FOR CONTROLLING MOVEMENT OF A PAYLOAD

(71) Applicant: Omron Corporation, Kyoto (JP)

(72) Inventors: Seth Dunten, Castro Valley, CA (US); Wai Leong Yeo, Singapore (SG)

(73) Assignee: OMRON Corporation, Kyoto (JP)

( * ) Notice: Subject to any disclaimer, the term of this patent is extended or adjusted under 35 U.S.C. 154(b) by 140 days.

(21) Appl. No.: 17/655,465

(22) Filed: Mar. 18, 2022

(65) Prior Publication Data

US 2022/0297951 A1    Sep. 22, 2022

Related U.S. Application Data

(60) Provisional application No. 63/163,582, filed on Mar. 19, 2021.

(51) Int. Cl.
| | | |
|---|---|---|
| *B65G 13/075* | (2006.01) | |
| *B65G 47/88* | (2006.01) | |
| *B60P 1/48* | (2006.01) | |
| *B60P 1/52* | (2006.01) | |

(52) U.S. Cl.
CPC ............ *B65G 47/8823* (2013.01); *B60P 1/48* (2013.01); *B60P 1/52* (2013.01); *B65G 2205/04* (2013.01)

(58) Field of Classification Search
None
See application file for complete search history.

(56) References Cited

U.S. PATENT DOCUMENTS

| | | | | |
|---|---|---|---|---|
| 3,970,180 A | * | 7/1976 | Schlottmann | ...... B65G 47/8823 193/35 A |
| 3,990,557 A | * | 11/1976 | Carder | ................... B65G 13/00 187/217 |
| 4,184,579 A | * | 1/1980 | Kantarian | .......... B65G 47/8823 193/40 |
| 4,185,729 A | | 1/1980 | Obermeyer | |

(Continued)

FOREIGN PATENT DOCUMENTS

| | | |
|---|---|---|
| JP | 11-157646 | 6/1999 |
| JP | 2011001184 | 1/2011 |

OTHER PUBLICATIONS

International Search Report and Witten Opinion for PCT Application No. JP2022/012842 dated May 10, 2022 in 9 pages.

*Primary Examiner* — Joseph A Dillon, Jr.
(74) *Attorney, Agent, or Firm* — Knobbe, Martens, Olson & Bear LLP

(57) ABSTRACT

Features are disclosed for a stopping device that is resistant to forces in a first direction and compliant with forces in a second direction. The stopping device may be implemented in a roller top to restrict undesired horizontal movement of a payload being transported across the roller top. In some embodiments, the roller top can be implemented on a mobile robot to transport a payload between destinations. The stopping device can include a plurality of linkages to engage the stopping device and reduce forces applied to the stopping device by the payload. The stopping device, in an engaged position, may limit undesired horizontal movement of the payload. Further, the stopping device, in the engaged position, may respond to vertical forces applied to the stopping device by transitioning from the engaged position to a disengaged position.

28 Claims, 8 Drawing Sheets

(56) References Cited

U.S. PATENT DOCUMENTS

| | | | | |
|---|---|---|---|---|
| 4,732,068 | A * | 3/1988 | Yasuda | B26D 5/086 83/695 |
| 5,000,591 | A * | 3/1991 | Burgess | B41J 11/20 400/73 |
| 5,168,976 | A * | 12/1992 | Kettelson | B23Q 16/008 193/35 A |
| 5,211,276 | A * | 5/1993 | Clopton | B65G 47/8823 198/463.4 |
| 5,860,505 | A * | 1/1999 | Metzger | B65G 47/8823 198/463.6 |
| 6,234,292 | B1 * | 5/2001 | Schut | B65G 47/8823 198/463.6 |
| 8,083,049 | B2 * | 12/2011 | Novak | B65G 57/06 193/35 A |
| 8,708,131 | B2 * | 4/2014 | Fukano | B65G 47/8815 193/35 A |
| 9,090,407 | B2 * | 7/2015 | Matsumoto | B65G 43/00 |
| 10,227,181 | B2 * | 3/2019 | Loizeau | B65G 13/075 |
| 10,273,093 | B2 * | 4/2019 | Loizeau | B65G 47/8823 |
| 10,752,157 | B1 * | 8/2020 | Zeller | B65G 67/24 |
| 10,889,441 | B1 * | 1/2021 | Pajevic | B60P 1/649 |
| 10,988,325 | B2 * | 4/2021 | Lundberg | B65G 47/8884 |
| 11,738,977 | B2 * | 8/2023 | Lilley | G05D 1/0234 414/495 |
| 2018/0265305 | A1 * | 9/2018 | Loizeau | B65G 47/29 |
| 2018/0290839 | A1 * | 10/2018 | Heger | B65G 47/8823 |
| 2019/0152705 | A1 * | 5/2019 | Guo | B65G 13/075 |
| 2020/0164737 | A1 * | 5/2020 | Kozlenok | G05D 1/0293 |
| 2021/0114429 | A1 * | 4/2021 | Fan | B60G 17/0152 |
| 2022/0153519 | A1 * | 5/2022 | Popa | B65G 1/0464 |
| 2023/0216312 | A1 * | 7/2023 | Laborde | B25J 5/007 320/107 |

* cited by examiner

SYSTEM AND METHOD FOR CONTROLLING MOVEMENT OF A PAYLOAD

RELATED APPLICATION(S)

This application claims priority to U.S. Provisional Application. No. 63/163,582, filed Mar. 19, 2021, entitled "SYSTEM AND METHOD FOR CONTROLLING MOVEMENT OF A PAYLOAD," which is hereby incorporated by reference in its entirety. Any and all applications for which a foreign or domestic priority claim is identified in the Application Data Sheet as filed with the present application are incorporated by reference under 37 CFR 1.57 and made a part of this specification.

TECHNICAL FIELD

This disclosure generally relates to a stopping device, such as for preventing or limiting unwanted movement of a payload when the payload is being transported, e.g., by a mobile robot.

BACKGROUND

Mobile robots are used in various industries to automate tasks typically performed by humans such as transporting a payload from a first location to a second location. Mobile robots can include a number of electronics that enable the mobile robots to perform tasks. To enable the transportation of the payload from the first location to the second location, the mobile robots can include a platform upon which a payload is placed for transportation from the first location to the second location. In one example, upon receiving the payload, the mobile robot can move to the second location in order to place the payload in the second location. The mobile robot can be responsible for moving a payload between a plurality of locations

SUMMARY

One aspect of the present disclosure is a system for controlling movement of a payload. The system can include a stopper configured to be in a first position in a first mode of operation and in a second position in a second mode of operation. The stopper, in the first position, can allow movement of the payload in a first direction. The stopper, in the second position, can impede the movement of the payload in the first direction. The system can further include a plurality of linkages. The plurality of linkages can include a pivot. The system can further include a restoring device. The restoring device can apply a restoring force to the pivot. Application of the restoring force to the pivot can cause the pivot to engage with an actuation device. The system can further include the actuation device. The actuation device can apply a transition force to the pivot. Application of the transition force can cause the stopper, via the plurality of linkages, to transition from the first position to the second position. Application of an overload force in a second direction to the stopper can cause the stopper to transition from the second position to the first position.

In another aspect of the present disclosure, the actuation device, in a first orientation, can apply an initial force to the pivot based at least in part on application of the restoring force to the pivot. Application of the initial force to the pivot can cause the stopper to remain in the first position.

In another aspect of the present disclosure, the actuation device can apply the transition force to the pivot by transitioning from the first orientation to a second orientation and applying the transition force to the pivot. Application of the transition force can cause the stopper to transition from the first position to the second position based at least in part on the initial force exceeding the transition force.

In another aspect of the present disclosure, the first direction can correspond to a horizontal direction and the second direction can correspond to a vertical direction.

In another aspect of the present disclosure, the system can include a mobile robot. The mobile robot can deliver the payload. The stopper can limit unwanted movement of the payload during delivery of the payload.

In another aspect of the present disclosure, the system can include a driver. The driver can cause the actuation device to apply the transition force. The driver can include a motor, an electro-magnet, a pneumatic cylinder, or a hydraulic cylinder.

In another aspect of the present disclosure, in order to transition the stopper to the second position, the plurality of linkages can form an obtuse angle. In order to transition the stopper to the first position, the plurality of linkages can form an acute angle.

In another aspect of the present disclosure, the restoring device can include a spring, a counter weight, or a magnet.

In another aspect of the present disclosure, the actuation device can include a cam, an eccentric shaft, a pneumatic device, a linear actuator, or a ball screw.

In another aspect of the present disclosure, the actuation device can include a cam and the pivot can include a cam follower. The actuation device can rotate and produce corresponding linear movement of the pivot. The corresponding linear movement of the pivot can cause the stopper, via the plurality of linkages, to transition from the first position to the second position.

In another aspect of the present disclosure, the application of the transition force can cause the stopper to transition from the first position to the second position based at least in part on the restoring force exceeding the transition force.

In another aspect of the present disclosure, the application of the overload force in the second direction to the stopper can cause the stopper to transition from the second position to the first position based at least in part on the overload force exceeding the restoring force.

In another aspect of the present disclosure, the application of the overload force in the second direction to the stopper can cause the stopper to transition from the second position to the first position based at least in part on a combination of the overload force and the transition force exceeding the restoring force.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

Figure 1A:
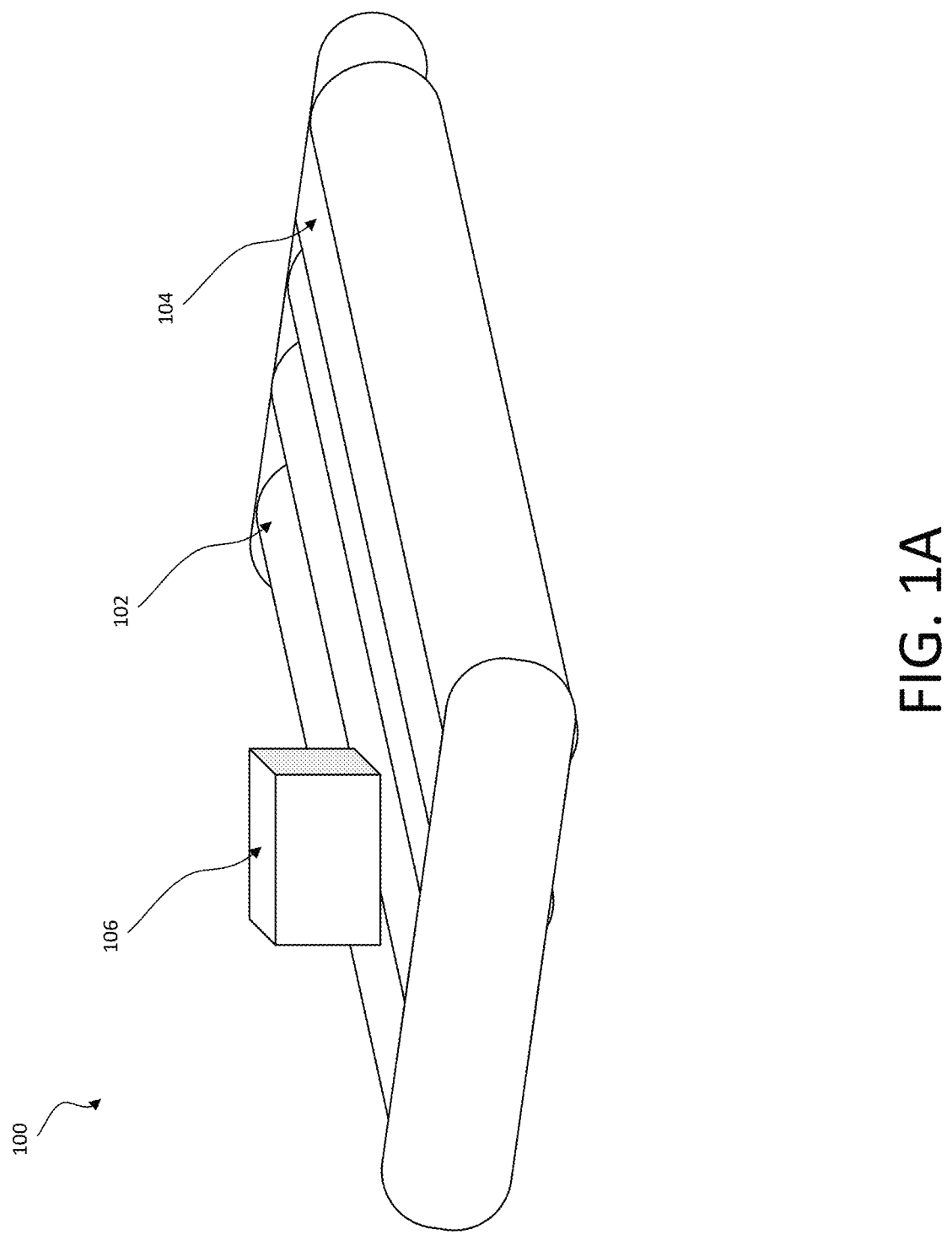
FIG. 1A illustrates a roller top including a stopping device in a first position according to some embodiments.

Generally described, the present disclosure relates to a stopping device or system that impedes applied forces in a first direction (e.g., a horizontal direction) and is compliant to applied forces in a second direction (e.g., a vertical direction). In some embodiments, the stopping device may be utilized on a mobile robot. As described herein, the use of such a stopping device can limit the forces that are provided or applied to the stopping device upon engagement of the stopping device. By impeding movement in the first direction, the stopping device can restrict (e.g., limit, impede, etc.) the unwanted movement of an item in the first direction. Furthermore, by being compliant in the second direction, the stopping device can reduce the force that is applied to the stopping device in the event that an overload force is applied in the second direction (e.g., when an item is dropped on the stopping device). By limiting the force applied to the stopping device and additional components, the stopping device can reduce damage to the item, the stopping device, the mobile robot, etc.

As described herein, a platform (e.g., a roller top) can transport an item (e.g., a payload) from a first location to a second location. For example, the platform may correspond to a platform on a device (e.g., mobile robot, an automated device, etc.). Further, the device can load the item on the platform. In some embodiments, the item can be loaded on the platform (e.g., by a user, by another device, etc.). The platform can include a stopping device. The stopping device can be engaged, either automatically or manually, such that unintended movement of the item is prohibited. For example, the stopping device can be raised and/or lowered into the path of an item to prohibit the unintended movement of the item. Upon engagement of the stopping device, the item may be prohibited or limited from moving in a first direction (e.g., horizontally). For example, the engagement of the stopping device, may prevent the item from falling off the platform or shifting.

In many conventional cases, implementing a stopping device to limit (e.g., impede, thwart, stop, etc.) the unwanted movement of an item may not provide satisfactory results in particular circumstances or for particular users. Such a stopping device may be capable of transitioning from a first position into a second position that impedes the horizontal movement of the item. Once the stopping device is in the second position, the stopping device may limit unwanted horizontal movement of the item. The stopping device may be a rigid device in order to impede the horizontal movement of the item. Further, the stopping device may utilize linear motion to move the stopping device (e.g., to engage the stopping device). The use of such a linear motion may result in large bending moments and high stresses in the structure of the stopping device and/or the platform. While the stopping device may withstand force in the horizontal direction applied to the stopping device, the application of a force in the vertical direction to the stopping device may result in the stopping device and/or additional components (e.g., a mobile robot) being rendered inoperable. For example, when a force is applied in the vertical direction to the stopping device (e.g., by dropping an item vertically on the stopping device), the stopping device may break and may be incapable of further transitioning between the first position and the second position. In some cases, the application of the force in the vertical direction may not break the stopping device. However, the source of the force may remain engaged with the stopping device such that the device is incapable of delivering items and/or an item cannot be disengaged for delivery. As the stopping device can be designed to limit movement of large items in a horizontal direction (e.g., items weighing over two thousand pounds), application of this weight in a vertical direction may result in the disablement of particular components.

As mobile robots proliferate, the demand for automated delivery of items to locations has also increased. The present disclosure provides a system for restricting the undesired movement of a payload during delivery with significant advantages over prior implementations. The present disclosure provides systems and methods that enable a reduction in the amount of force that is applied to a stopping device during engagement of the stopping device, relative to traditional stopping devices, without significantly affecting the stopping device's ability to restrict unwanted movement of a payload or significantly affecting the efficiency of the stopping device. These advantages are provided by the embodiments discussed herein, and specifically by creation of a stopping device that is restrictive to force in a first direction and compliant to force in a second direction to reduce the force applied to the stopping device.

As described herein, a stopping device (e.g., a stopping system) may be implemented to restrict movement of a payload in a first direction. The stopping device may be implemented within a roller top (e.g., a set of rollers, a top roller, a roller belt, etc.) to carry a payload to a destination. The stopping device may include a stopper (e.g., a stopping bar) to impede movement of the payload. The stopping device may be implemented on a mobile robot to limit the unwanted movement of a payload that is being delivered by the mobile robot. In some embodiments, the stopping device and the roller top may not be implemented on a mobile robot and may be implemented on a separate system (e.g., as a self-contained roller top that includes a stopping device, a delivery apparatus that includes a stopping device, etc.). For example, the stopping device and the roller top may be implemented as a separate roller top within an assembly line and/or within a factory. As the payload is being delivered by the mobile robot, the payload may shift (e.g., in response to the mobile robot stopping, speeding up, turning, etc.) in a manner unintended by the user of the mobile robot. Such unintended movement can cause damage to the payload and/or the mobile robot. As described herein, the use of the stopping device can limit the unwanted movement of a payload when the payload is on the roller top. By limiting the unwanted movement of the payload, the payload can restrict the payload from falling off the mobile robot, shifting in an undesired manner, or otherwise moving. Furthermore, use of the stopping device can reduce damage to the payload, the mobile robot, the roller top, or any other component of the system.

As described herein, in order to transition the stopping device between a first position and a second position, the stopping device may include and/or be linked to a plurality of linkages that include a pivot (e.g., a pivot point). A first force (e.g., a restoring force) may be applied to the pivot that causes the pivot to engage with a device (e.g., an actuation device). The device may provide a second force to the pivot (e.g., a transition force) that causes the stopping device, via the plurality of linkages, to transition between the first position and the second position. Therefore, the device can cause the stopping device to transition to a second position to impede movement (e.g., forces) in a first direction (e.g., a horizontal direction). An overload force can be applied to the stopping device (e.g., by dropping an item on the stopping device) in a second direction (e.g., a vertical direction). In the event that the overload force exceeds the first force, the stopping device can transition from the second position to the first position while the overload force is applied to the stopping device (e.g., by an item, another device, a person, etc.). Thus, where such a stopping device is implemented, while the device is providing the second force to the pivot, the stopping device may remain in the first position due to the overload force. The stopping device can remain in the first position until the overload force is removed from the stopping device (e.g., the roller top moves the dropped item off of the stopping device). The plurality of linkages may be compliant with the overload force and thus limit the overload forces that can be applied in an undesirable direction and can result in a component of the system failing.

As described herein, the stopping device may transition between a first position and a second position via a plurality of linkages. The plurality of linkages may comprise a first angle (e.g., an acute angle) when the stopping device is retracted and/or in a first position and a second angle (e.g., an obtuse angle) when the stopping device is extended and/or in a second position. In some embodiments, when the stopping device is extended, the plurality of linkages may form a nearly straight angle. The use of such an angle can enable the isolation of forces from a motor of the actuation device. A force applied to the stopping device (e.g., by a payload, by a horizontal force, etc.) may pass through the plurality of linkages. For example, a force applied to the stopping device that attempts to rotate the stopping device around a point in a clockwise rotation may pass through the plurality of linkages. The amount of the force passed through and applied to the actuation device and/or the motor of the actuation device may be proportional to the angle of the plurality of linkages. For example, if the plurality of linkages form a 180 degree angle (e.g., form a straight line), no portion of the force may be exerted on the actuation device and/or the motor of the actuation device. Therefore, by utilizing a plurality of linkages that form a nearly straight angle (e.g., a 170 degree angle), the portion of the force applied to the stopping device and passed through to the actuation device and/or the motor of the actuation device may be minimized. The use of a plurality of linkages that form a nearly straight angle may minimize the potential for damage to the actuation device and/or the motor of the actuation device.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Roller Top

FIG. 1A shows an example roller top 100, according to one embodiment. The roller top 100 can include a plurality of cylinders 102 and a stopping device 104 in order to transport a payload 106. In some embodiments, the roller top 100 may be implemented on a mobile robot. In other embodiments, the roller top 100 may be implemented as a standalone system and/or a separate system. The roller top 100 may be configured to transport the payload 106 along the roller top 100 via the plurality of cylinders 102. In some embodiments, the roller top 100 may include any other type of conveyor (e.g., a vibrating conveyor, a magnetic conveyor, or any other type of conveyor).

Each of the plurality of cylinders 102 may be associated with a motor and/or a driver. The plurality of cylinders 102 may further be associated with one or more pulleys, chains, belts, etc. in order to be driven. In some embodiments, the plurality of cylinders 102 may be associated with the same motor and/or driver. In response to receiving input from the motor and/or the driver, the plurality of cylinders 102 can rotate. In some embodiments, the speed of the rotation of the plurality of cylinders 102 can be varied. For example, the magnitude and/or frequency of a signal provided by the motor and/or the driver can be varied to modify the speed of the rotation of the plurality of cylinders 102. Therefore, the plurality of cylinders 102 can be driven in response to received signals. As the plurality of cylinders 102 rotate, a payload 106 placed on the plurality of cylinders 102 may be transported (horizontally moved) across the plurality of cylinders 102.

The roller top 100 may further include a stopping device 104 in order to restrict movement of the payload 106 via the plurality of cylinders 102. The stopping device 104 can further restrict movement of the payload 106 sliding on the plurality of cylinders 102 (e.g., due to low friction). The stopping device 104 can be implemented within or separate from the plurality of cylinders 102. As seen in FIG. 1A, the stopping device 104 is implemented between cylinders of the plurality of cylinders 102. The stopping device 104 can be driven by a motor and/or a driver to cause the stopping device 104 to move from a first position (e.g., a state of disengagement) to a second position (e.g., a state of engagement). In the first position, the stopping device 104 may not significantly impede the horizontal movement of the payload 106 along the roller top 100. Further, via the plurality of cylinders 102, the roller top 100 may transport the payload 106 across the roller top 100 and over the stopping device 104.

Figure 1B:
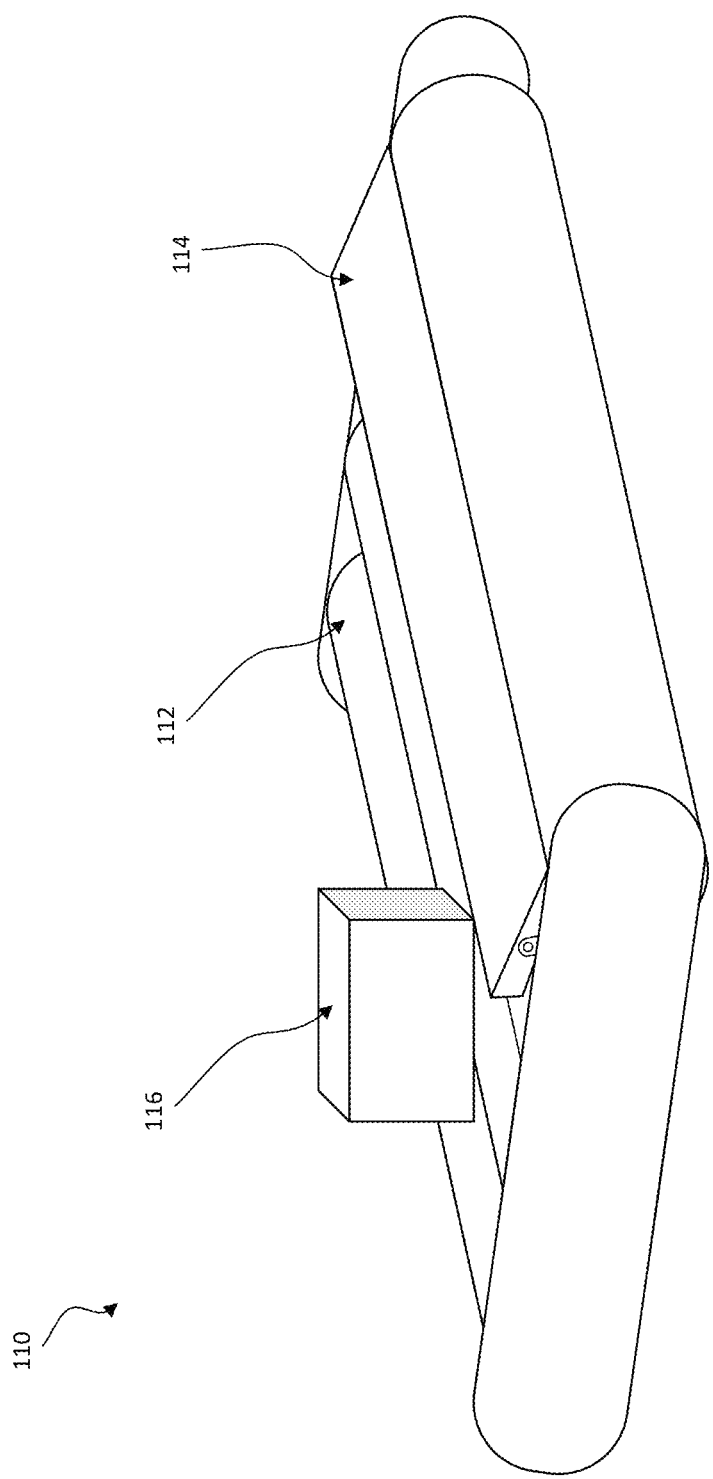
FIG. 1B illustrates a roller top including a stopping device in a second position according to some embodiments.

FIG. 1B shows an example roller top 110, according to one embodiment. The roller top 110 can include a plurality of cylinders 112 and a stopping device 114 in order to transport a payload 116. In some embodiments, the roller top 110 may be implemented on a mobile robot. In other embodiments, the roller top 110 may be implemented as a standalone system and/or a separate system. The roller top 110 may be configured to transport the payload 116 along the roller top 110 via the plurality of cylinders 112. In some embodiments, the roller top 100 and the roller top 110 may correspond to the same roller top. For example, the roller top 100 can correspond to a roller top with the stopping device 104 in a first position and the roller top 110 can correspond to a roller top with the stopping device 114 in a second position.

The roller top 110 may further include a stopping device 114 in order to restrict movement of the payload 116 via the plurality of cylinders 112 (e.g., the movement based on the rotation of the plurality of cylinders 112 or a low friction of the plurality of cylinders 112). The stopping device 114 can be transitioned from the first position, as seen in FIG. 1A, to a second position, as seen in FIG. 1B. The stopping device 114 can transition to the second position based upon a determination that transportation of the payload 116 is unsafe, the payload 116 should not be delivered to a destination, the payload 116 should be examined, etc. In the second position, the stopping device 114 may impede the horizontal movement of the payload 116 along the roller top 110. For example, the stopping device 114, in the second position, may limit the payload 116 from further movement along the roller top 110 upon the payload 116 contacting the stopping device 114. The payload 116 may be restricted from movement along the roller top 110 while the stopping device 114 is in the second position. Once the stopping device 114 is transitioned from the second position to the first position, the payload 116 may continue movement along the roller top 110. In some embodiments, the roller top 110 may include one or more walls on one or more sides of the roller top 110 to prevent movement of the payload 116. For example, the roller top 110 may include walls on a first side and a second side to prevent movement of the payload 116 and a third side and a fourth side may not include walls and may include a stopping device 114 to prevent movement of the payload 116. In some embodiments, the stopping device 114 can be implemented on either side of the payload to prevent movement of the payload 116 in a first direction and/or a second direction. For example, when the payload 116 is in a first position, a first side of the stopping device 114 can prevent forward movement of the payload 116 and, when the payload 116 is in a second position, a second side of the stopping device 114 can prevent reverse movement of the payload 116. Further, multiple stopping devices can be implemented on the roller top 110.

Mobile Robot

Figure 2A:
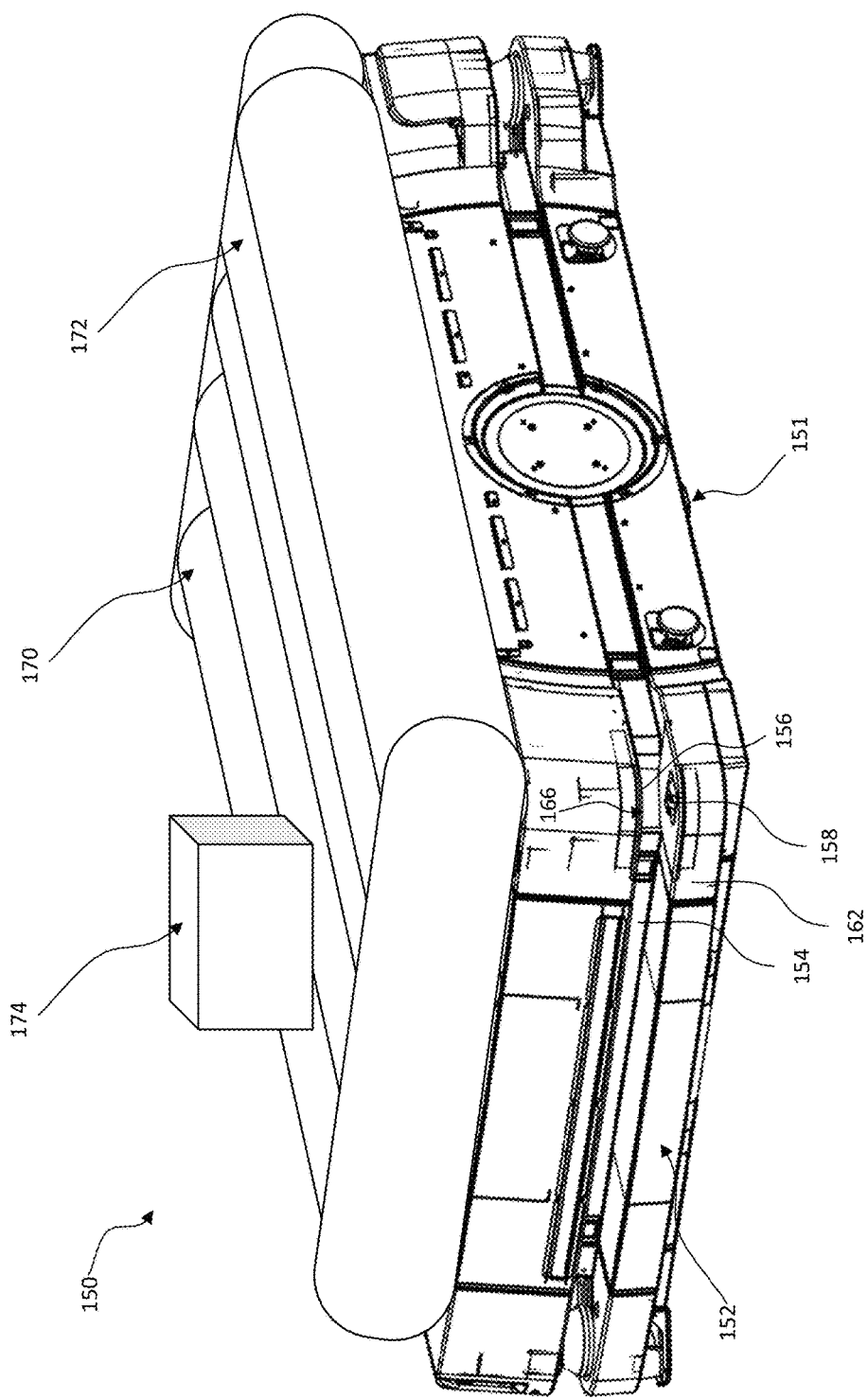
FIG. 2A illustrates an example mobile robot including a stopping device in a first position according to some embodiments.

FIG. 2A shows an example mobile robot 150, according to one embodiment. The mobile robot 150 can include one or more wheels 151, a front face 152 that forms a receiving interface 154 for connecting to a docking station (not shown in FIG. 2A). The mobile robot 150 can include a first electrical contact 156 and a second electrical contact 158 as well as an actuator 162 for charging with a docking station. The first electrical contact 156 may include a plurality of connectors, and/or the second electrical contact 158 may include a plurality of connectors. The mobile robot 150 can also include one or more magnets 166 near and/or within the receiving interface 154. The mobile robot 150 can further include a roller top 170 and a stopping device 172 for use in transportation of a payload 174.

The mobile robot 150 can be autonomous or semi-autonomous. The mobile robot 150 can include a plurality of sensors for sensing the environment. The sensors can include LIDAR and other laser-based sensors and/or range finders for mapping the robot's surroundings. The mobile robot 150 can include a laser slit including a range finding or LIDAR-type laser contained therein. The mobile robot 150 can include a user interface (not shown) for manually inputting instructions and/or receiving information from the mobile robot 150. In some embodiments, a control panel can additionally or alternatively be located on a side or under a plate or otherwise in an unexposed location on the mobile robot 150.

The robot 150 can be generally oriented along a forward-reverse direction F-RV and along a left-right direction L-RT. The forward direction F can be along generally the forward motion of the robot. The reverse direction RV can be opposite the forward direction. The left-right direction L-RT can be orthogonal to the forward-reverse direction F-RV. The left-right direction L-RT and the forward-reverse direction F-RV can be coplanar, for example on a generally horizontal plane.

The wheels 151 can be coupled with a chassis. The wheels 151 can be caster wheels. The wheels 151 can support a load on the chassis against a ground surface. In certain embodiments, the wheels 151 can include individual or combined suspension elements (e.g., springs and/or dampers). Accordingly, in some embodiments, the wheels 151 can move (e.g., up and down) to accommodate uneven terrain, for shock absorption, and for load distribution. In some embodiments, the wheels 151 can be fixed so that they do not move up and down, and the ground clearance height of the mobile robot 150 can be constant regardless of the weight or load of the mobile robot 150. In some examples, one or more of the wheels 151 may be undriven.

The support system can include a drive assembly that can provide acceleration, braking, and/or steering of the mobile robot 150. In some embodiments, the drive assembly drives two wheels. These two wheels may be the wheels that guide the motion and direction of the mobile robot 150. For example, if both drive wheels rotate in a first direction, the mobile robot 150 can move forward; if both drive wheels move in a second direction, the robot can move in reverse; if the drive wheels move in opposite directions, or if only one of drive wheels moves, or if the drive wheels move at different speeds, the robot can turn. Braking can be performed by slowing the rotation of the drive wheels, by stopping rotation of the drive wheels, or by reversing direction of the drive wheels. The drive assembly can be coupled (e.g., pivotably coupled) with the chassis. The drive assembly can be configured to engage with the ground surface through a suspension system.

Many variations are possible. For example, a single drive assembly can be used, in some cases, which can move the robot forward and/or backward, and steering can be implemented using a separate steering system, such as one or more steering wheels that can turn left or right. In some embodiments, the mobile robot 150 can include 2, 3, or 4 drive assemblies. In certain alternative embodiments, the mobile robot 150 includes only driven wheels and no undriven support wheels. In some embodiments, the one or more drive assemblies can support at least some weight of the mobile robot 150 and/or payload 174. In some examples, the mobile robot 150 can include two drive wheels and two non-driven support wheels.

The mobile robot 150 can include one or more sensors for measuring motion of one or more of the wheels 151, such as the driven wheels. A sensor system may be used to detect and/or calculate rotation, position, direction, and/or other kinematic information from the movement of the wheels 151. In some examples, a plurality of sensors may be used to determine the kinematic information of each wheel. For example, each wheel may be associated with an optical sensor and a magnetic sensor for determining the rotation of the wheel. Use of multiple sensors can be beneficial by providing a redundancy to the kinematic information so that if one system can for some reason not communicate its readings to a controller (e.g., malfunction, environmental shock, etc.), the other (or others) can provide the information. Thus, a system failing may not mean that the controller becomes blind to the kinematic information. A further benefit of multiple sensors may be that the accuracy of the information may be improved because the controller may be able to rely on a greater amount of data in determining what the likely true values are. Examples of optical sensors include encoders (e.g., rotary, linear, absolute, incremental, etc.). Examples of magnetic sensors includes bearing sensors or other speed sensors. The mobile robot 150 can include other types of sensors, such as mechanical sensors, temperature sensors, distance sensors (e.g., rangefinders), and/or other sensors.

The mobile robot 150 can further include a roller top 170. The roller top 170 may include a plurality of cylinders such that a payload 174 can easily move when placed on the roller top 170. By rotating the plurality of cylinders, the payload 174 can be moved across the roller top 170. For example, by rotating the plurality of cylinders, a payload 174 can be moved on to the roller top 170 and/or off the roller top 170. The mobile robot 150 can approach a storage source (using the wheels 151) and retrieve the payload 174 by rotating the plurality of cylinders, move the payload 174 to a storage destination, and deposit the payload 174 at the storage destination by rotating the plurality of cylinders. In some embodiments, the mobile robot 160 can automatically initiate the rotation of the plurality of cylinders to retrieve destinations. For example, by detecting that the mobile robot 150 has arrived at the storage source, the mobile robot 160 can cause the plurality of cylinders to rotate in order to receive the payload 174. In other embodiments, a user, via a user computing device or by otherwise engaging with the mobile robot 150 (e.g., by pushing a button on the mobile robot 150), can initiate the rotation of the plurality of cylinders. In some embodiments, the mobile robot 150 may not include a roller top 170 and may include a different surface for placement of a payload 174. For example, the mobile robot 150 may include a conveyor belt. It will be understood that the mobile robot 150 can include a plurality of types of platforms in order to obtain a payload 174 and deliver the payload 174 to a destination.

The mobile robot 150 can further include a stopping device 172 that is implemented with (or within) the roller top 170. For example, the roller top 170 can include four cylinders. The first cylinder may be located adjacent to the second cylinder, the second cylinder may be located adjacent to the third cylinder, and the stopping device 172 may be implemented between the third cylinder and the fourth cylinder. It will be understood that the stopping device 172 can be implemented at any location of the roller top 170. For example, the stopping device 172 may be located after the plurality of cylinders. In some embodiments, the roller top 170 can include a plurality of stopping devices 172. For example, a stopping device 172 may be implemented between each cylinder of the plurality of cylinders. The mobile robot 150 may be able to transition the stopping device 172 between a first position (e.g., a disengagement position) and a second position (e.g., an engagement position). The stopping device 172, in the first position, may allow horizontal movement of the payload 174 and, in the second position, may restrict horizontal movement of the payload 174. In the example of FIG. 1, the stopping device 172 is in the first position such that the stopping device 172 allows horizontal movement of the payload 174. For example, upon rotation of the plurality of the cylinders, the payload 174 may be transported across the roller top 170 without impedance from the stopping device 172. In some embodiments, the stopping device 172 may provide a minimal level of impedance to transportation of the payload 174. For example, the stopping device 172, in the first position, may slightly impede the transportation of the payload 174 as the payload 174 is transported across the roller top 170 due to friction. In some embodiments, the stopping device may be located on a vertical plane (e.g., on a wall of the roller top 170) such that extension of the stopping device 172 (e.g., from the wall of the roller top 170) impedes horizontal movement. Therefore, the stopping device 172, in the first position, can enable movement of the payload 174 across the roller top 170.

Figure 2B:
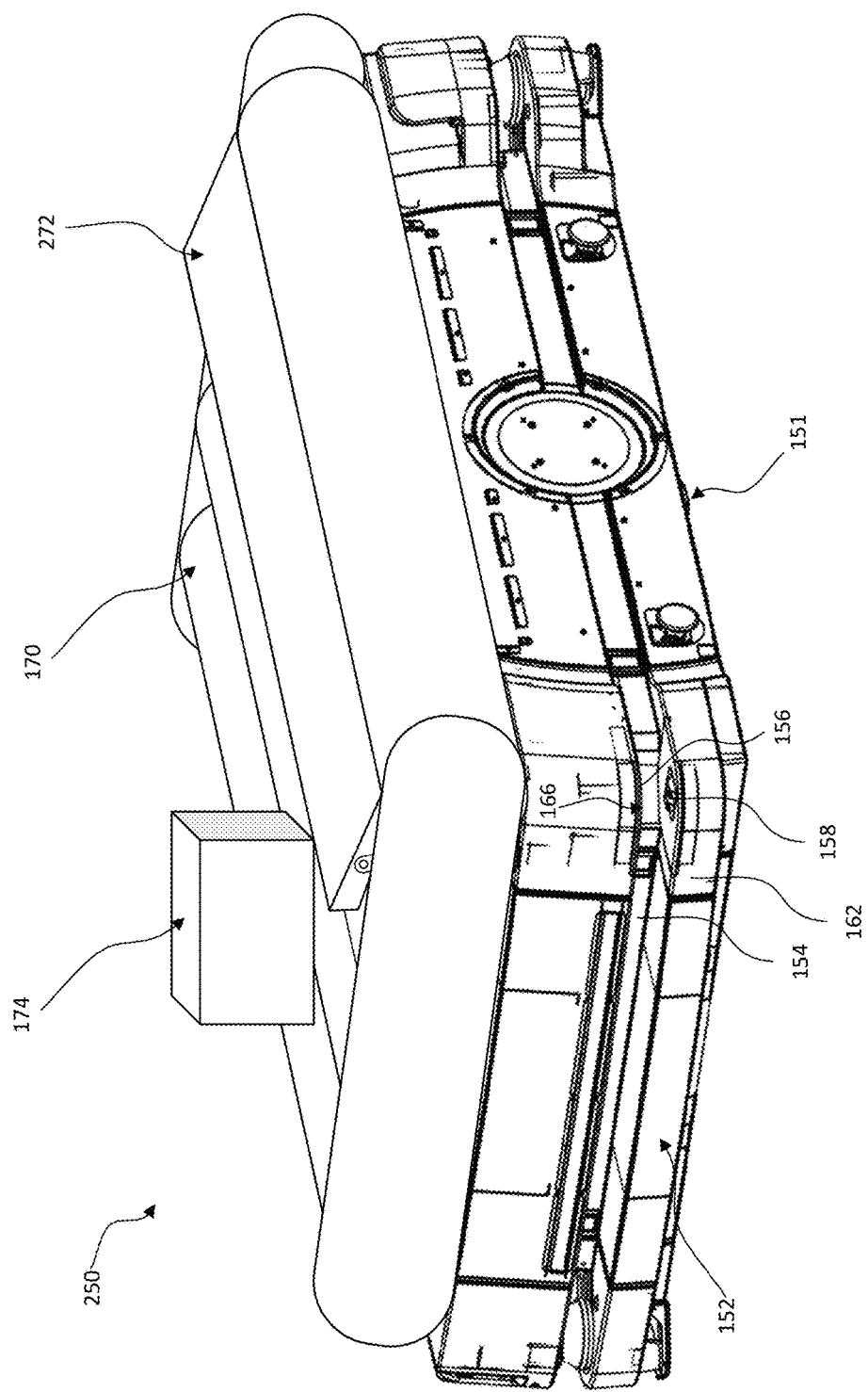
FIG. 2B illustrates an example mobile robot including a stopping device in a second position according to some embodiments.

FIG. 2B shows an example mobile robot 250, according to one embodiment. Similar to the mobile robot 150 as shown in FIG. 2A, the mobile robot 250 can include one or more wheels 151, a front face 152 that forms a receiving interface 154 for connecting to a docking station, a first electrical contact 156, a second electrical contact 158, an actuator 162 for charging with a docking station, one or more magnets 166, a roller top 170, and a stopping device 272 for use in transportation of a payload 174. In some embodiments, the mobile robot 250 and the mobile robot 150 may correspond to the same mobile robot. For example, the mobile robot 150 can correspond to a mobile robot with the stopping device 172 in a first position and the mobile robot 250 can correspond to a mobile robot with the stopping device 272 in a second position.

The mobile robot 250 can further include a stopping device 272 that is implemented with (or within) the roller top 170. As discussed above, the mobile robot 250 may be able to transition the stopping device 272 between a first position (e.g., a disengagement position) and a second position (e.g., an engagement position). In the example of FIG. 2, the stopping device 272 is in the second position such that the stopping device 272 restricts (e.g., impedes, limits, etc.) horizontal movement of the payload 174. For example, upon rotation of the plurality of the cylinders, the payload 174 may be transported across the roller top 170. Upon the payload 174 reaching the stopping device 272, the payload 174 may be restricted from further horizontal movement by the stopping device 272. In some embodiments, the plurality of cylinders may continue to rotate and the stopping device 272 may cause the payload 174 to retain its position or a similar position along the roller top 170. In other embodiments, upon the payload 174 encountering the stopping device 272 and/or at a particular time after the payload 174 encountering the stopping device 272, the plurality of cylinders may discontinue rotation. For example, the mobile robot 250 can include one or more sensors that can detect a position of the stopping device 272. The mobile robot 250 may use the one or more sensors to determine the position of the stopping device 272 and, if the mobile robot 250 determines that the stopping device 272 is in the second position may discontinue rotation of the plurality of cylinders. The mobile robot 250 may refrain from causing rotation of the plurality of cylinders until the one or more sensors indicate that the stopping device 272 is in the first position. Therefore, the stopping device 272, in the second position, can limit horizontal movement of the payload 174 across the roller top 170.

Upon application of a vertical force, the stopping device 272 can transition from the second position to a first position. For example, if another payload is dropped on the stopping device 272 vertically, the stopping device 272 can transition to the first position in order to prevent excess damage to the stopping device 272, the roller top 170, the mobile robot 250, etc. Upon release of the vertical force, the stopping device 272 can transition from the first position to the second position. For example, another payload may be dropped on the stopping device 272 and while the payload is on the stopping device 272, the stopping device 272 may be in the first position. Upon removal of the payload from the stopping device 272 or otherwise lessening the vertical force applied to the stopping device 272, the stopping device 272 can transition to the second position. Therefore, the stopping device 272 can transition between the second position and the first position based on an application of a vertical force.

Stopping Device in Retracted Position

Figure 3:
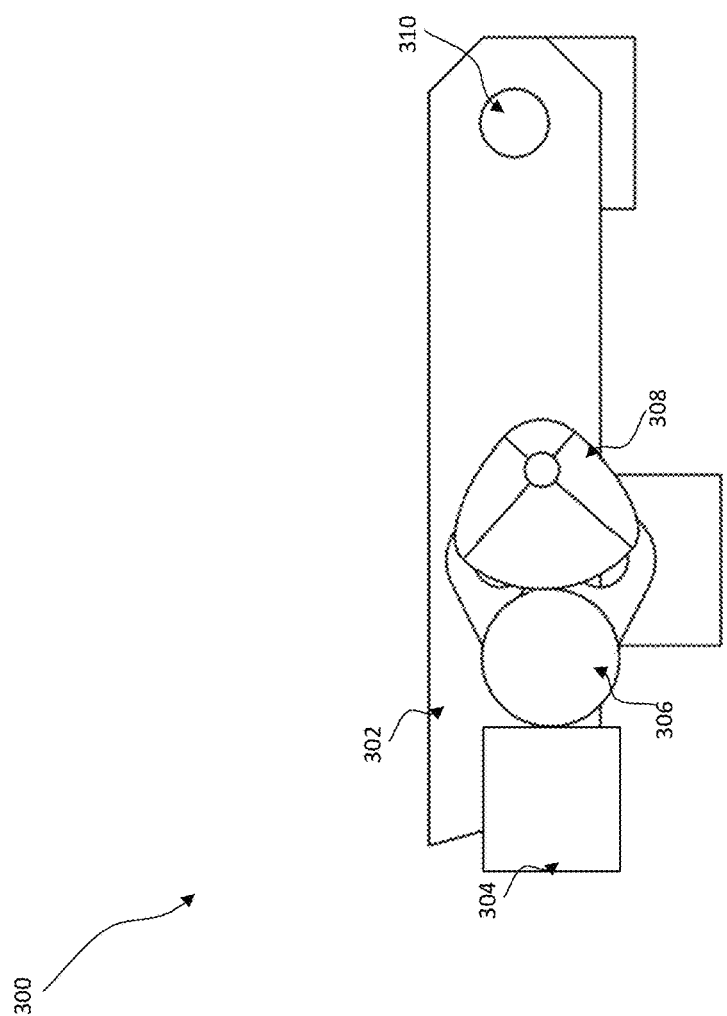
FIG. 3 illustrates an example stopping device in a first position according to some embodiments.

FIG. 3 illustrates an example stopping device 300 in a first position according to some embodiments. The stopping device 300 may be similar to the stopping device 104 of FIG. 1A, the stopping device 114 of FIG. 1B, the stopping device 172 of FIG. 2A, and/or the stopping device 272 of FIG. 2B, but illustratively the stopping device 300 may be in a first position similar to the stopping device 104 of FIG. 1A and/or the stopping device 172 of FIG. 2A. Specifically, as shown in FIG. 3, the stopping device 300 is in a first position (a retracted position or state). In the first position, the stopping device 300 may be level with a plurality of cylinders in order to allow efficient transportation of a payload across the plurality of cylinders. In some embodiments, the stopping device 300, in the first position, may not be level with the plurality of cylinders and may be elevated or recessed as compared to the plurality of cylinders. For example, the stopping device 300, in the first position, may form a recess between a plurality of cylinders such that a payload can be transported over the stopping device without the stopping device 300 impacting the horizontal movement of the payload. The stopping device 300 may include a stopping member 302, a pivot 306, and a joint 310 and may be responsive to a restoring force applied by a restoring device 304 and a transition force applied by an actuation device 308 in order to transition the stopping device 300 between a first position and a second position. Thus, the stopping device 300, in the first position, may allow horizontal movement of a payload.

The stopping device 300 may include a stopping member 302 configured to impede horizontal movement of a payload when the stopping device 300 is in a second position. The stopping member 302 may be a stopping bar, one or more stopping spikes, or any other stopping member that can impede movement of a payload. The stopping member 302 may be physically connected to a joint 310. The joint 310 may enable the stopping device 300 to transition between the first position and the second position. For example, the joint 310 may include a ball joint, a pin joint, a kinematic joint, or any other type of joint. The joint 310 may enable movement of the stopping member 302 in at least one degree of freedom and may restrict movement of the stopping member 302 in at least one other degree of freedom. Therefore, the joint 310 can enable the stopping device 300 to transition between the first position and the second position.

The stopping device 300 may further include a plurality of linkages (not shown in FIG. 3) and a pivot 306. The plurality of linkages and the pivot 306 may be located at a midpoint of the stopping member 302. In some embodiments, the plurality of linkages and the pivot 306 may be located at different endpoints along the stopping member 302. For example, the plurality of linkages and the pivot 306 may be located at an end of the stopping member 302. The plurality of linkages and the pivot 306 may be used to transition the stopping device 300 between the first position and the second position. In order to transition between the first position and the second position, a restoring device 304 and an actuation device 308 may contact the pivot 306.

In order to enable transition of the stopping device 300 between the first position and the second position, the stopping device 300 can include the restoring device 304. The restoring device 304 may be any device capable of generating a force (a restoring force). For example, the restoring device 304 may be a spring, a counter weight, a magnet, an air cylinder, an air spring, etc. that generates the force. The restoring device 304 may apply the force to the pivot 306. In some embodiments, the force may be a moment force about the joint 310. For example, the force may be a moment force in a clockwise direction, a moment force in the clockwise direction on a lower linkage of the plurality of linkages, a moment force in a counter-clockwise direction on an upper linkage of the plurality of linkages. In other embodiments, the plurality of linkages may be a flexible member such that the plurality of linkages apply the force in an effort to restore a straight form of the flexible member (e.g., the actuation device 308 may provide an initial force in a first direction that causes the flexible member to flex and the flexible member may apply a force in a second direction in an effort to unflex. Due to the application of the force to the pivot 306, the restoring device 304 may cause the pivot 306 to interact with (e.g., contact) the actuation device 308. For example, as will be discussed below, the pivot 306, via the plurality of linkages, may move, in response to the force, and contact at least a portion of the actuation device 308. The restoring device 304 may continuously apply the force in order to maintain contact between the pivot 306 and the actuation device 308. In some embodiments, a counteractive force may be applied to the pivot 306 that counteracts the force and causes the pivot 306 and the actuation device 308 to lose contact. Therefore, the restoring device 304 can apply the force to the pivot 306 to cause the pivot 306 to maintain contact with the actuation device 308.

The actuation device 308 may interact with the pivot 306 in order to transition the stopping device 300 between the first position and the second position. The actuation device 308 may be any device capable of generating a force (e.g., an actuation force, a transition force, etc.). For example, the actuation device 308 may be a cam, an eccentric device (e.g., an eccentric shaft), a linear actuator, a ball screw, an air cylinder, a hydraulic cylinder, or any other device capable of producing an initial force and a transition force. The actuation device 308 may be driven by a motor and/or a driver (e.g., a motor, an electro-magnet a pneumatic cylinder, a hydraulic cylinder, etc.) in order to generate the force. Further, the actuation device 308 may be electrically or pneumatically driven. The actuation device 308 may correspond to a first orientation and a second orientation. It will be understood that the actuation device 308 can correspond to more, less, or different orientations. In the first orientation, the actuation device 308 may be applying an initial force to the pivot 306 and may cause the stopping device 300 to move to or remain in a first position. In the second orientation, the actuation device 308 may be applying the transition force to the pivot 306 and may cause the stopping device 300 to move to or remain in a second position. In some embodiments, the actuation device 308, may apply a minimal (e.g., marginal, reduced, etc.) force to the pivot 306.

Further, the transition force may be less than the initial force. In the example of FIG. 3, the actuation device 308 is in a first orientation and, therefore, the stopping device 300 is in the first position. For example, the actuation device corresponding to the first orientation may cause the stopping device 300 to remain in a first position or transition to the first position.

Stopping Device in Extended Position

Figure 4:
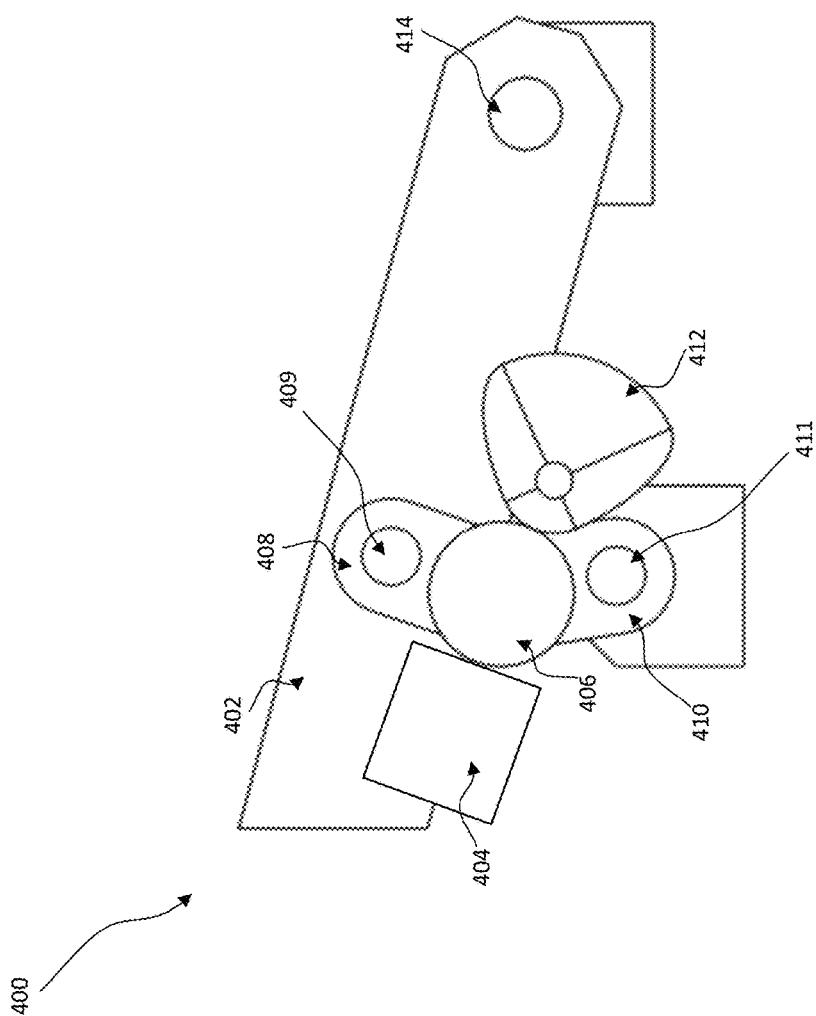
FIG. 4 illustrates an example stopping device in a second position according to some embodiments.

FIG. 4 illustrates an example stopping device 400 in a second position according to some embodiments. The stopping device 400 may be similar to the stopping device 104 of FIG. 1A, the stopping device 114 of FIG. 1B, the stopping device 172 of FIG. 2A, the stopping device 272 of FIG. 2B, and/or the stopping device 300 of FIG. 3, but illustratively the stopping device 400 may be in a second position similar to the stopping device 114 of FIG. 1B and/or the stopping device 272 of FIG. 2B. Specifically, as shown in FIG. 4, the stopping device 400 is in a second position (an extended position or state). In the second position, the stopping device 400 may not be level with a plurality of cylinders in order to impede horizontal movement of a payload (e.g., transportation of a payload across the plurality of cylinders). For example, in the second position, a portion of the stopping device 400 (e.g., the stopping member) may be raised into the path of the payload. It will be understood that the portion of the stopping device 400 raised into the path of the payload may include more, less, or different portions of the stopping device 400. The stopping device 400 may include a stopping member 402, a pivot 406, a first linkage 408 of a plurality of linkages, a second linkage 410 of the plurality of linkages, and a joint 414 and may be responsive to a restoring force applied by a restoring device 404 and a transition force applied by an actuation device 412 in order to transition the stopping device 400 between a first position and a second position. Thus, the stopping device 400, in the second position, may limit undesired movement of a payload.

The plurality of linkages may include a first linkage 408 and a second linkage 410 in order to transition the stopping device 400 between the first position and the second position. It will be understood that the plurality of linkages may include more, less, or different linkages. In some embodiments, the plurality of linkages may be located on either side of the stopping member 402. In other embodiments, a first plurality of linkages may be located on a first side of the stopping member 402 and a second plurality of linkages may be located on a second side of the stopping member 402. The plurality of linkages may enable the extension of the stopping device 400 into the second position via the pivot 406. The plurality of linkages may not be directly connected to the actuation device 412. As previously discussed, the restoring device 404 may apply a restoring force to the pivot 406 that causes the pivot 406 to contact the actuation device 412. Upon application of the transition force by the actuation device 412 to the pivot 406, the plurality of linkages may extend and may move the stopping device 400 to the second position. The plurality of linkages, when extended, may form a substantially straight line or angle. Further, the plurality of linkages, when extended, may form an obtuse angle between the first linkage 408 and the second linkage 410. For example, the plurality of linkages, when extended, may form a 175 degree angle, a 170 degree angle, a 160 degree angle, or any other obtuse angle. The restoring force applied by the restoring device 404 and the transition force applied by the actuation device 408 as applied to the pivot 406 may cause the plurality of linkages to maintain the substantially straight line or angle. Therefore, the plurality of linkages may enable the transition of the stopping device 400 between the first position and the second position.

The stopping member 402 may be resistant to the application of forces in a similar orientation as the stopping member 402. For example, if the stopping member 402 is oriented horizontally, the stopping member 402 may resist horizontal forces and if the stopping member 402 is oriented vertically, the stopping member 402 may resist vertical forces. Forces applied to the stopping member 402 (e.g., by a payload that is being transported across a roller top) in a first direction may be resisted by the first linkage 408 and the second linkage 410 due to the application of the transition force by the actuation device 412. The stopping member 402 may limit unwanted movement (e.g., horizontal movement) of a payload due to the resistance provided by the first linkage 408 and the second linkage 410. A first portion of the force applied to the stopping member 402 may be applied to the plurality of linkages. A second portion of the force applied to the stopping member 402 may be applied to the actuation device 412. In some embodiments, the first portion of the force may be larger than the second portion of the force. The second portion of the force may be based at least in part on the angle formed by the plurality of linkages. For example, the distance from the pivot 406 to a line formed between a first point 409 associated with the first linkage 408 and a second point 411 associated with the second linkage 410. In some embodiments, the second portion of the force may decrease as the angle formed by the plurality of linkages approaches 180 degrees such that no force may be applied to the actuation device 412 in the event that the plurality of linkages form an 180 degree angle. Therefore, the stopping member 402 can resist forces applied in a first direction when the stopping device 400 is in a second position.

Stopping Device in Retracted Position with Overload Force

Figure 5:
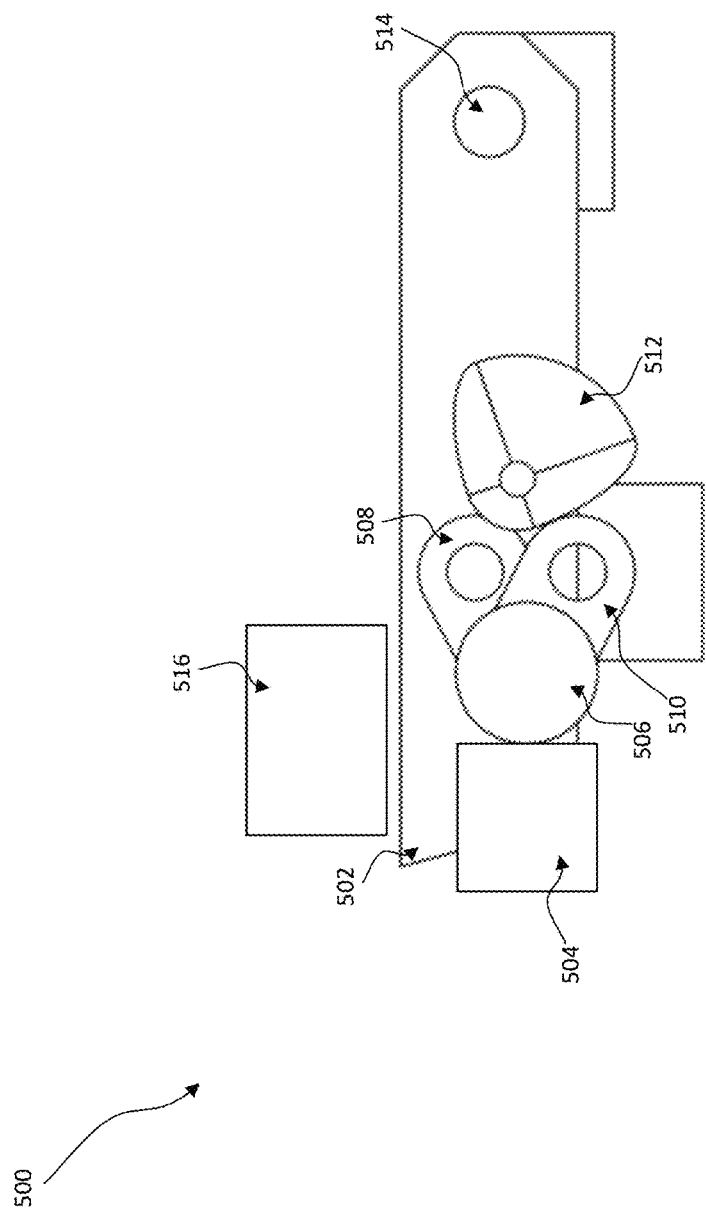
FIG. 5 illustrates an example stopping device in a third position according to some embodiments.

FIG. 5 illustrates an example stopping device 500 in a third position according to some embodiments. The stopping device 500 may be similar to the stopping device 104 of FIG. 1A, the stopping device 114 of FIG. 1B, the stopping device 172 of FIG. 2A, the stopping device 272 of FIG. 2B, the stopping device 300 of FIG. 3, and/or the stopping device 400 of FIG. 4, but illustratively the stopping device 500 may be in a third position. Specifically, as shown in FIG. 5, the stopping device 500 is in a third position (a retracted position caused by the application of an overload force). The stopping device 500 may include a stopping member 502, a pivot 506, a first linkage 508 of a plurality of linkages, a second linkage 510 of the plurality of linkages, and a joint 514 and may be responsive to a restoring force applied by a restoring device 504, a transition force applied by an actuation device 512, and an overload force applied by an item 516. It will be understood that one or more of the restoring force, the transition force, or the overload force may be applied manually (e.g., by a user of the stopping device). Thus, the stopping device 500 may be in a third position due to the application of an overload force.

As previously discussed, the stopping device 500 may be in a second position. In the second position, the stopping device 500 may limit movement (e.g., resist the application of forces) in a first direction. An overload force may be applied to the stopping device 500 in a second direction by an item 516. For example, an item 516 may be dropped on the stopping member 502 while the stopping device 500 is extended in the second position. Via the plurality of linkages, the overload force may be applied against the restoring force. In the event that the overload force is greater than the restoring force, the stopping device 500 may transition to the first position. The restoring force may be a minimal amount of force to initiate contact between the pivot 506 and the actuation device 512. Further, the restoring force may be less than threshold level of force than is determined to be acceptable to be applied to the stopping member 502 in the first direction. For example, in order to avoid application of forces larger than 100 Newtons to the stopping member 502, the restoring force applied to the pivot may be less than 100 Newtons, such that application of a force over 100 Newtons in the second direction exceeds the restoring force and causes the stopping device 500 to transition to the second position. The application of an overload force that exceeds the restoring force may cause the pivot 506 to disengage with the actuation device 512. In some embodiments, the application of an overload force that exceeds the restoring force, may cause the pivot retain a particular amount of engagement (e.g., a minimal amount of engagement) with the actuation device 512. Therefore, as the pivot 506 may be disengaged with the actuation device 512, the stopping device 500 may be moved to the first position.

The stopping device 500 may remain in the first position as the overload force is applied to the stopping member 502. Subsequently, the overload force may be removed from the stopping member 502. For example, the item 516 may be removed from the stopping member 502 (e.g., the roller top may move the item 516). Upon removal of the overload force, the restoring force applied by the restoring device 504 may cause the pivot 506 and the actuation device 512 to engage. In some embodiments, upon the restoring force exceeding the applied overload force, the restoring force applied by the restoring device 504 may cause the pivot 506 and the actuation device 512 to engage. Based on the engagement of the pivot 506 and the actuation device 512 and the orientation of the actuation device 512 (e.g., the actuation device 512 is in the second orientation), the actuation device 512 may apply the transition force to the pivot 506 and cause the extension of the stopping member 502 (e.g., cause the transition of the stopping device 500 into the second position). In some embodiments, while the overload force is being applied to the stopping member 502, the actuation device 512 may be modified to the first orientation, such that upon removal of the overload force and engagement of the pivot 506 and the actuation device 512, the actuation device 512 applies the initial force and does not apply the transition force and the stopping device 500 remains in the second position. Therefore, the removal of the overload force can cause the engagement of the pivot 506 and the actuation device 512.

Retracting a Stopping Device Based on Overload Force

Figure 6:
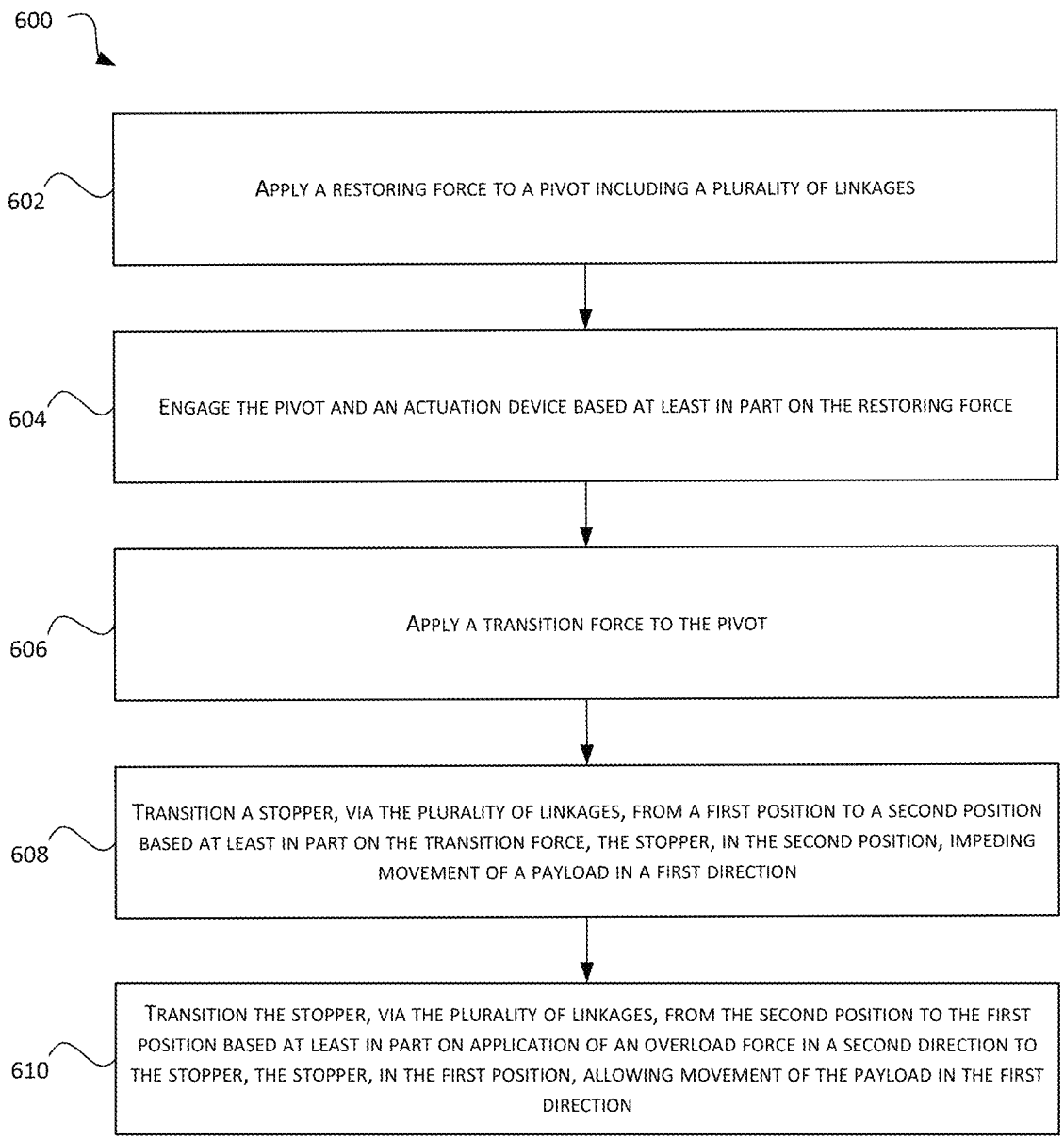
FIG. 6 is a flowchart of an example routine for limiting unwanted movement of a payload using a stopping device according to some embodiments.

FIG. 6 shows a method 600 executed by a stopping device for limiting unwanted movement of a payload, according to some embodiments of the disclosed technologies. The stopping device may be similar, for example, to the stopping device 114 of FIG. 1B, the stopping device 172 of FIG. 2A, the stopping device 272 of FIG. 2B, the stopping device 300 of FIG. 3, the stopping device 400 of FIG. 4, and/or the stopping device 500 of FIG. 5 and may include a stopping member 502, a pivot 506, a first linkage 508 of a plurality of linkages, a second linkage 510 of the plurality of linkages, and a joint 514 and may be responsive to a restoring force applied by a restoring device 504, transition and initial forces applied by an actuation device 512, and an overload force applied by an item 516. The stopping device may be implemented on a roller top. In some embodiments, the stopping device and the roller top may be implemented on a mobile robot configured to deliver a payload. Further, the stopping device may be implemented on a roller top of the mobile robot in order to limit unwanted movement of the payload during delivery of the payload. The stopping device may be resistant to forces (e.g., limit movement) in a first direction (e.g., a horizontal direction) and may be compliant to forces in a second direction (e.g., a vertical direction).

In block 602, the stopping device, via a restoring device, applies a restoring force to a pivot including a plurality of linkages. The stopping device may include a stopper configured to be in a first position in a first mode of operation and in a second position in a second mode of operation. Prior to application of a transition force and based on application of an initial force by an actuation device, the stopper may be in the first position. The stopper, in the first position, allows movement of a payload in the first direction. The restoring device may include one or more of a spring, counter weight, or a magnet. Therefore, the stopping device can apply a restoring force to the pivot.

In block 604, the stopping device engages the pivot and an actuation device based at least in part on the restoring force. The actuation device may include one or more of a cam, an eccentric shaft, a pneumatic device, a linear actuator, or a ball screw. For example, the actuation device may include a cam and the pivot may include a cam follower. The actuation device may correspond to multiple orientations. In a first orientation, the actuation device may apply an initial force to the pivot based at least in part on application of the restoring force to the pivot. Application of the initial force to the pivot may cause the stopper to remain in the first position. Thus, the stopping device can engage the pivot and the actuation device based at least in part on the application of the restoring force.

In block 606, the stopping device, via the actuation device, applies a transition force to the pivot. In order to apply the transition force (e.g., a restoring force), the actuation device can transition from the first orientation to the second orientation and apply the transition force to the pivot. The stopping device may include a driver that can cause the actuation device to apply the transition force. The driver can include one or more of a motor, an electro-magnet, a pneumatic cylinder, or a hydraulic cylinder. Therefore, the stopping device can apply a transition force to the pivot via the actuation device.

In block 608, the stopping device transitions the stopper, via the plurality of linkages, from a first position to a second position based at least in part on the transition force. The stopper, in the second position, impedes movement of a payload in a first direction. For example, the actuation device may rotate and produce corresponding linear movement of the pivot. The corresponding linear movement of the pivot may cause the stopper to transition from the first position to the second position. The application of the transition force can cause the stopper to transition from the first position to the second position based at least in part on the restoring force exceeding the transition force applied by the actuation device. In order to transition the stopper to the second position, the plurality of linkages may form an obtuse angle. The application of the transition force may cause the stopper to transition from the first position to the second position based at least in part on the restoring force exceeding the transition force. Therefore, the stopping device can transition the stopper based on the transition force.

In block 610, the stopping device transitions the stopper, via the plurality of linkages, from the second position to the first position based at least in part on an application of an overload force in a second direction to the stopper. For example, the overload force may be a force applied by an item dropped on the stopper. Further, the overload force may be a force exceeding a range of acceptable forces. Based on the application of the overload force, the stopper may transition from the second position to the first position. In order to transition the stopper to the first position, the plurality of linkages may form an acute angle. The application of the overload force may cause the stopper to transition from the second position to the first position based at least in part on the one or more of the transition force exceeding the restoring force or the overload force exceeding the restoring force. In some embodiments, the application of the overload force may cause the stopper to transition from the second position to the first position based at least in part on the combination of the overload force and the transition force (e.g., the sum of the overload force and the transition force, the average of the overload force and the transition force, etc.) exceeding the restoring force. Therefore, the stopping device can transition the stopper based on the overload force.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Summary

Several illustrative examples of stopping devices for mobile robots have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of stopping systems for mobile robots and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims. In some embodiments, the drive systems and/or support systems disclosed herein can be used to move other devices or systems different than a mobile robot.

What is claimed is:

1. A system for controlling movement of a payload, the system comprising:
    a stopper configured to be in a first position in a first mode of operation and in a second position in a second mode of operation, wherein the stopper, in the first position, allows movement of the payload in a first direction, wherein the stopper, in the second position, impedes the movement of the payload in the first direction;
    a plurality of linkages, the plurality of linkages comprising a pivot;
    a restoring device configured to apply a restoring force to the pivot, wherein application of the restoring force to the pivot causes the pivot to engage with an actuation device; and
    the actuation device configured to apply a transition force to the pivot, wherein application of the transition force causes the stopper, via the plurality of linkages, to transition from the first position to the second position,
    wherein application of an overload force in a second direction to the stopper causes the stopper to transition from the second position to the first position.

2. The system of claim 1, wherein the actuation device, in a first orientation, is further configured to apply an initial force to the pivot based at least in part on application of the restoring force to the pivot, wherein application of the initial force to the pivot causes the stopper to remain in the first position.

3. The system of claim 2, wherein the actuation device is further configured to apply the transition force to the pivot by:
    transitioning from the first orientation to a second orientation; and
    applying the transition force to the pivot,
    wherein the application of the transition force causes the stopper to transition from the first position to the second position based at least in part on the initial force exceeding the transition force.

4. The system of claim 1, wherein the first direction corresponds to a horizontal direction and the second direction corresponds to a vertical direction.

5. The system of claim 1, the system further comprising:
    a mobile robot configured to deliver the payload,
    wherein the stopper is configured to limit unwanted movement of the payload during delivery of the payload.

6. The system of claim 1, the system further comprising:
    a driver configured to cause the actuation device to apply the transition force, wherein the driver comprises a motor, an electro-magnet, a pneumatic cylinder, or a hydraulic cylinder.

7. The system of claim 1, wherein in order to transition the stopper to the second position, the plurality of linkages form an obtuse angle, wherein in order to transition the stopper to the first position, the plurality of linkages form an acute angle.

8. The system of claim 1, wherein the restoring device comprises a spring, a counter weight, or a magnet.

9. The system of claim 1, wherein the actuation device comprises a cam, an eccentric shaft, a pneumatic device, a linear actuator, or a ball screw.

10. The system of claim 1, wherein the actuation device comprises a cam and the pivot comprises a cam follower, wherein the actuation device is further configured to rotate and produce corresponding linear movement of the pivot, wherein the corresponding linear movement of the pivot causes the stopper, via the plurality of linkages, to transition from the first position to the second position.

11. The system of claim 1, wherein the application of the transition force causes the stopper to transition from the first position to the second position based at least in part on the restoring force exceeding the transition force.

12. The system of claim 1, wherein the application of the overload force in the second direction to the stopper causes the stopper to transition from the second position to the first position based at least in part on the overload force exceeding the restoring force.

13. The system of claim 1, wherein the application of the overload force in the second direction to the stopper causes the stopper to transition from the second position to the first position based at least in part on a combination of the overload force and the transition force exceeding the restoring force.

14. A method for controlling movement of a payload, the method comprising:
applying a restoring force to a pivot, wherein the pivot is formed by a plurality of linkages;
engaging the pivot and an actuation device based at least in part on the applying of the restoring force to the pivot;
applying a transition force to the pivot;
transitioning a stopper, via the plurality of linkages, from a first position to a second position based at least in part on the applying of the transition force to the pivot, wherein the stopper, in the first position, allows movement of the payload in a first direction, wherein the stopper, in the second position, impedes the movement of the payload in the first direction; and
transitioning the stopper, via the plurality of linkages, from the second position to the first position based at least in part on an application of an overload force in a second direction to the stopper.

15. The method of claim 14, further comprising:
applying an initial force to the pivot based at least in part on application of the restoring force to the pivot, wherein the initial force corresponds to a first orientation of the actuation device, wherein application of the initial force to the pivot causes the stopper to remain in the first position.

16. The method of claim 15, further comprising:
wherein applying the transition force to the pivot comprises:
transitioning the actuation device from the first orientation to a second orientation; and
applying the transition force to the pivot, wherein the application of the transition force causes the stopper to transition from the first position to the second position based at least in part on the initial force exceeding the transition force.

17. The method of claim 14, wherein the actuation device comprises a cam and the pivot comprises a cam follower, wherein the transitioning of the stopper from the first position to the second position is further based at least in part on the actuation device rotating and producing corresponding linear movement of the pivot, wherein the corresponding linear movement of the pivot causes the stopper, via the plurality of linkages, to transition from the first position to the second position.

18. The method of claim 14, wherein the first direction corresponds to a horizontal direction and the second direction corresponds to a vertical direction.

19. The method of claim 14, wherein in order to transition the stopper to the second position, the plurality of linkages form an obtuse angle, wherein in order to transition the stopper to the first position, the plurality of linkages form an acute angle.

20. The method of claim 14, wherein applying the restoring force to the pivot comprises applying the restoring force by a restoring device to the pivot, wherein the restoring device comprises a spring, a counter weight, or a magnet.

21. The method of claim 14, wherein applying the transition force to the pivot comprises applying the transition force by an actuation device to the pivot, wherein the actuation device comprises a cam, an eccentric shaft, a pneumatic device, a linear actuator, or a ball screw.

22. The method of claim 14, wherein the transitioning of the stopper from the second position to the first position is further based at least in part on a combination of the overload force and the transition force exceeding the restoring force.

23. A delivery apparatus comprising:
a stopper, the stopper corresponding to a first position and a second position, wherein the stopper, in the first position, allows movement of a payload in a first direction, wherein the stopper, in the second position, impedes the movement of the payload in the first direction;
a plurality of linkages, the plurality of linkages comprising a pivot;
a restoring device configured to apply a first force to the pivot, wherein application of the first force to the pivot causes the pivot to engage with an actuation device; and
the actuation device configured to apply a second force to the pivot, wherein application of the second force causes the stopper, via the plurality of linkages, to transition from the first position to the second position, wherein application of a third force in a second direction to the stopper causes the stopper to transition from the second position to the first position.

24. The delivery apparatus of claim 23, wherein the actuation device, in a first orientation, is further configured to apply an initial force to the pivot based at least in part on application of the first force to the pivot, wherein application of the initial force to the pivot causes the stopper to remain in the first position.

25. The delivery apparatus of claim 24, wherein the actuation device is further configured to apply the second force to the pivot by:
transitioning from the first orientation to a second orientation; and
applying the second force to the pivot,
wherein the application of the second force causes the stopper to transition from the first position to the second position based at least in part on the initial force exceeding the second force.

26. The delivery apparatus of claim 23, wherein the actuation device comprises a cam and the pivot comprises a cam follower, wherein the actuation device is further configured to rotate and produce corresponding linear movement of the pivot, wherein the corresponding linear movement of the pivot causes the stopper, via the plurality of linkages, to transition from the first position to the second position.

27. The delivery apparatus of claim 23, wherein the first direction corresponds to a horizontal direction and the second direction corresponds to a vertical direction.

28. The delivery apparatus of claim 23, wherein in order to transition the stopper to the second position, the plurality of linkages form an obtuse angle, wherein in order to transition the stopper to the first position, the plurality of linkages form an acute angle.

* * * * *